UNITED STATES PATENT OFFICE 1,951,935

PROCESS FOR SINTERING FINE ORES OR THE LIKE

Friedrich Johannsen, Magdeburg, Germany, assignor to firm Fried. Krupp Grusonwerk Aktiengesellschaft, Magdeburg-Buckau, Germany No Drawing. Application February 23, 1933, Serial No. 658,248. In Germany March 2, 1932

1 Claim. (Cl. 75—65)

The present invention relates to the sintering of fine ores or metallurgical products—e. g., lead ores, copper ores, iron ores or flue dust. It has been proposed to conduct such a process in sintering pots, Dwight-Lloyd apparatus, or in a rotary furnace, the sintering being effected by the combustion of combustible substances that are present—e. g., sulphur or added fuel—with a supply of air. In the further working up of the sintered material in the metallurgical smelting processes—e. g., in a shaft furnace for lead-substances containing iron, such as mill scale or welding slag, must be added in most cases in order to convert the gangue, such as silicic acid or limestone or both together, that is present in the ores into a slag which is suitable for the process and, as a rule, is rather rich in iron. The fluxes containing iron that frequently occur in commerce—e. g., welding slag—always contain a considerable quantity of silicic acid and lime, so that a portion of the iron present therein is not available for the scorification of the gangue. These fluxes must therefore be employed in comparatively large quantities and occasion a large amount of slag and, consequently, high losses of metal in the slag.

According to the invention, these disadvantages of the method of working hitherto employed are avoided by employing for the sintering process iron sponge wholly or partially as the fuel. By "iron sponge" is to be understood a product, which results from the reduction of substances containing iron, such as iron ores or dust from the throat of a furnace, at temperatures below the melting point of iron and which, if necessary, may be freed from the adherent gangue by comminution and magnetic separation. The employment of iron sponge for sintering has the advantage that, in the oxidizing sintering process there is produced, from the iron sponge, $Fe_3O_4$ which very easily forms slag at the temperatures of the sintering process and converts the individual parts of the material to be sintered into a firm sintered cake. The firmness of this sintered product, produced with the employment of iron sponge, is considerably greater than that of the sintered material that results with the addition of other fuels, such as coke, coal or sulphides. Moreover, substantially less residue is produced in the sintering process than in the method of working hitherto usual. Notwithstanding the scorification of the iron sponge in the sintering process, the porosity of the sintered product is just as good as in the sintered material hitherto obtained, since the iron sponge is finely distributed by appropriate mixing and the quantity of the added iron sponge may be so chosen that the formation of a uniformly scorified material is obtained.

The process is suitable for example for the sintering of lead ores and copper ores in which, in the ensuing smelting process, an iron flux is necessary. It is further suitable for the sintering of iron ores. Thus, for example, by employing this process poor iron ores may be treated in a more economical manner than hitherto, by working up a portion of the ore into sponge by reduction and magnetic separation and then sintering the remaining raw ore with this sponge. In this way there is obtained a sintered material which has a higher content of iron than is the case of sintering with other fuels and which therefore makes the blast-furnace work substantially more economical. In a similar manner, other materials containing iron,—e. g., fluedust or roasted pyrites,—may also be advantageously worked up. The employment of iron sponge for sintering and concentrating the charge of the blast furnace is above all advantageous when, in the case of raw materials or fuels containing sulphur, there is obtainable in the production of the sponge only an impure iron sponge which is unsuitable for the direct production of steel.

What I claim is:

A process for sintering fine ores or similar raw materials, in which combustion is effected by supply of air and practically pure iron sponge is employed at least as a substantial part of the fuel.

FRIEDRICH JOHANNSEN.